US012606223B2

(12) United States Patent (10) Patent No.: US 12,606,223 B2
Bu (45) Date of Patent: Apr. 21, 2026

(54) RAIL HEAD ABRASER

(71) Applicant: Shaoming Bu, Gulin (CN)

(72) Inventor: Shaoming Bu, Gulin (CN)

(73) Assignee: Shaoming Bu, Guilin (CN)

( * ) Notice: Subject to any disclaimer, the term of this patent is extended or adjusted under 35 U.S.C. 154(b) by 406 days.

(21) Appl. No.: 18/225,161

(22) Filed: Jul. 24, 2023

(65) Prior Publication Data

US 2023/0365173 A1 Nov. 16, 2023

Related U.S. Application Data

(63) Continuation of application No. PCT/CN2022/096733, filed on Jun. 2, 2022.

(51) Int. Cl.
B61L 23/04 (2006.01)
G01N 3/56 (2006.01)

(52) U.S. Cl.
CPC .............. B61L 23/045 (2013.01); G01N 3/56 (2013.01)

(58) Field of Classification Search
CPC ..................................................... B61L 23/045
See application file for complete search history.

(56) References Cited

U.S. PATENT DOCUMENTS

2022/0073113 A1* 3/2022 Chung ............... G01B 11/0691
2022/0189001 A1* 6/2022 Fernandez ............. G06V 10/56

FOREIGN PATENT DOCUMENTS

| CN | 112146538 | A | * | 12/2020 | ............. G01B 5/061 |
| CN | 215572532 | U | * | 1/2022 | |
| JP | 2018205157 | A | | 12/2018 | |
| KR | 200492500 | Y1 | | 10/2020 | |
| RU | 2206868 | C2 | | 6/2003 | |
| WO | WO-2014005582 | A1 | * | 1/2014 | ............. G01B 5/207 |

OTHER PUBLICATIONS

English description of CN-215572532U, retrieved from Espacenet on Oct. 31, 2025 (Year: 2025).*
The Extended European Search Report Dated Feb. 24, 2025 for corresponding European Patent Application No. 22902468.2.
Salco Products: "Rail head wear gauge", Apr. 25, 2017 (Apr. 25, 2017), pp. 1-1, XP093248074, Retrieved from the Internet: URL: https://www.salcoproducts.com/rail-head-wear-gauge.

* cited by examiner

*Primary Examiner* — Amelia Vorce

(57) ABSTRACT

Provided is a rail head abrader including a base, a blade, a vertical measurement section and a horizontal measurement section. The blade is disposed on the base, and an upper portion of the blade is engraved with vertical wear rail type selection lines. The vertical measurement section includes: a vertical scale frame slidably mounted on the blade; a vertical digital display device; and a vertical scale frame cursor. The horizontal measurement section includes: a horizontal scale frame disposed in an upper middle of the vertical scale frame; a horizontal measuring rod provided with a horizontal measuring rod probe and engraved with side wear rail type selection lines; a horizontal digital display device; and a horizontal scale frame cursor engraved with a horizontal scale frame cursor locating line corresponding with the side wear rail type selection lines. The horizontal measuring rod is slidably mounted on the horizontal scale frame.

2 Claims, 4 Drawing Sheets

RAIL HEAD ABRASER

CROSS-REFERENCE TO RELATED APPLICATIONS

The present application is a Continuation application of PCT Application No. PCT/CN2022/096733, filed on Jun. 2, 2022, which claims the priority of Chinese Patent Application No. 202220871717.3, filed on Apr. 15, 2022, the entire contents of which are hereby incorporated by reference.

TECHNICAL FIELD

The present invention relates to rail measurement techniques in rail transport, to the measurement of vertical wear and side wear of a rail head of a rail, and in particular to a rail head abrader.

DESCRIPTION OF THE PRIOR ART

During the processing and inspection of rails for rail transport, vertical wear and side wear measurements for rail head are often required for various rails of different sizes and shapes.

For rail abraders in the prior art, a rail abrader can only be positioned through the lower arc bend of the rail head disposed on the non-working surface of the rail head, to determine the locations of measured points of vertical wear and side wear of the rail head, and then measure the vertical wear and side wear values of the rail head through vernier calipers or digital calipers on the rail abrader. Since in the actual construction of railways, the main purpose of use of each railway section is different, there are also different types of rails, and the rail heads of different types of rails have different arc sizes at the lower arc bend of the lower arc, which results in the need to equip different models of rail abraders to achieve precise positioning for accurate measurement purposes during the measurement of vertical wear and side wear of the rail heads in different models.

Each section of the railway transportation department has to be equipped with different models of rail abraders due to the need to measure rails of different types, which is not conducive to reducing costs and tool management by the railway transportation department and cannot accommodate the need for rapid measurement of different rails in the rapid development of modern rail transport.

SUMMARY OF THE DISCLOSURE

An object of the present invention is to provide a rail head abrader which can quickly and accurately detect vertical wear and side wear of rail heads of different specifications in view of the deficiencies of the prior art, to realize the purpose that the vertical wear and side wear of the rail head of various types of rails can be accurately and conveniently measured with one abrader.

The technical solution to achieve the objective of the present invention is as follows:

A rail head abrader including a base, a blade, a vertical measurement section and a horizontal measurement section; wherein, an upper end surface of the base is horizontally disposed, a base bevel edge is provided on a lower left side of the base and a base vertical edge is provided in a middle of the base, the base bevel edge intersects the base vertical edge; the blade is disposed on the base and perpendicular to the upper end surface of the base, an upper portion of the blade is engraved with vertical wear rail type selection lines;

the vertical measurement section includes:

a vertical scale frame slidably mounted on the blade and slidable up and down; wherein a top portion of the vertical scale frame extends left to form a frame jaw, a front lower end of the frame jaw is provided with a frame jaw probe;

a vertical digital display device disposed at a lower portion of the vertical scale frame; and a vertical scale frame cursor disposed at an upper portion of the vertical scale frame;

the horizontal measurement section includes:

a horizontal scale frame disposed in an upper middle of the vertical scale frame;

a horizontal measuring rod, wherein a horizontal measuring rod probe is provided on a left end of the horizontal measuring rod, a left portion of the horizontal measuring rod is engraved with side wear rail type selection lines;

a horizontal digital display device disposed on a right portion of the horizontal scale frame; and a horizontal scale frame cursor engraved with a horizontal scale frame cursor locating line; wherein the horizontal scale frame cursor is disposed at a left portion of the horizontal scale frame; the horizontal scale frame cursor locating line corresponds with the side wear rail type selection lines;

wherein the horizontal measuring rod is slidably mounted on the horizontal scale frame and slidable left and right.

Further, the rail head abrader includes a handle which is a frame handle, wherein an upper portion of the handle is connected to the upper portion of the blade, and a lower portion of the handle is connected to the base.

A method of measuring vertical wear and side wear of the rail head by the rail head abrader as described above, includes the steps of:

1) adjusting a position of the vertical scale frame according to a current type of the rail under test, aligning an upper edge of an upper bevel edge of the vertical scale frame cursor on the vertical scale frame with a corresponding rail type line in the vertical wear rail type selection lines;

2) zeroing a display screen by pressing a clear switch on the vertical digital display device;

3) adjusting a position of the horizontal measuring rod according to the current type of the rail under test to align the horizontal scale frame cursor locating line with a corresponding rail type line of the rail under test in the side wear rail type selection lines;

4) zeroing a display screen by pressing a clear switch on the horizontal digital display device;

5) moving the vertical scale frame upwards and the horizontal measuring rod backwards to make way for the rail head of the rail under test, and clamping the base to the rail base below the working side of the rail under test, so that the base bevel edge and the base vertical edge are respectively in close fit with the rail base bevel edge and the rail base vertical edge of the rail under test;

6) moving the vertical scale frame downwards so that the frame jaw probe of the vertical scale frame is kept in contact with a top of the rail under test;

7) moving the horizontal measuring rod to the left so that the probe of the horizontal measuring rod is kept in contact with a side of the rail under test;

8) recording the number displayed on the display screen of the vertical digital display device at this time as the vertical wear of the rail under test, and the number displayed on the display screen of the horizontal digital display device at this time as the side wear of the rail under test.

Unlike existing rail abraders, the present invention does not use the lower arc bend of the rail head as a positioning reference for the vertical wear testing point and the side wear testing point, or the position where the bottom edge of the rail base meets its side vertical edge as a positioning reference for the vertical wear testing point, the objective that one abrader can accurately and easily measure both vertical wear and side wear of rail heads of various types of rails is achieved by using the following two innovative positioning modalities that:

1. as shown in FIG. 2 and FIG. 3, the intersection A of the upper bevel edge of the rail base and the side vertical edge of the rail base is used as a positioning reference point, the vertical distance from the positioning reference point to the vertical wear testing point of the corresponding rail type is used to determine an extension length of the frame jaw, to ensure that the measuring face of the frame jaw probe is always in contact with the vertical wear testing point of the selected rail; meanwhile, when the upper bevel edge of the vertical scale frame cursor is aligned with one rail type select line, the vertical distance of the measuring face C1 of the jaw probe to the intersection A where the base bevel edge meets the base vertical edge A1, i.e. the vertical distance D1 of is equal to the nominal vertical distance of the vertical wear testing point C of the rail head of the standard rail of current type to the intersection A where the upper bevel edge meets the side vertical edge of the standard rail base of current type, i.e. the nominal vertical distance ND1 of the standard rail C-A;

2. As shown in FIG. 2 and FIG. 3, using the highest point of the top centerline of the rail head under test as a positioning reference, the location of the side wear testing point of the current rail is determined according to the requirement for the vertical distance from the highest point of the top centerline of the rail head to the side wear testing point of the rail head in the respective national standards (Note: The side wear testing point of the rail head in one national standard is the same location for all rails within that standard, for example, the Canadian rail standard specifies ⅝" down from the highest point of the top centerline of the rail head under test as the side wear testing point of all rails); meanwhile, when the horizontal scale frame cursor locating line is aligned with one rail type selection line on the horizontal measuring rod, the horizontal distance of the measuring face B1 of the horizontal measuring rod to the intersection A1 where the base bevel edge intersects the base vertical edge, i.e. the horizontal distance of B1-A1, is equal to the nominal horizontal distance of the side wear testing point B of the rail head of the standard rail of current type to the intersection A where the upper bevel edge intersects the side vertical edge of the standard rail base of current type, i.e. the nominal horizontal distance ND2 of the standard rail B-A.

When the abrader of the present invention is used to detected rail heads, only one rail head abrader is required for each track division for fast and accurate measurement of vertical wear and side wear on all models of rails, and has the advantages of simple construction, economy, flexible adjustment, to accommodate the need for fast and accurate measurement of various rail type abrasions by the rail transportation sector.

Figure 1:
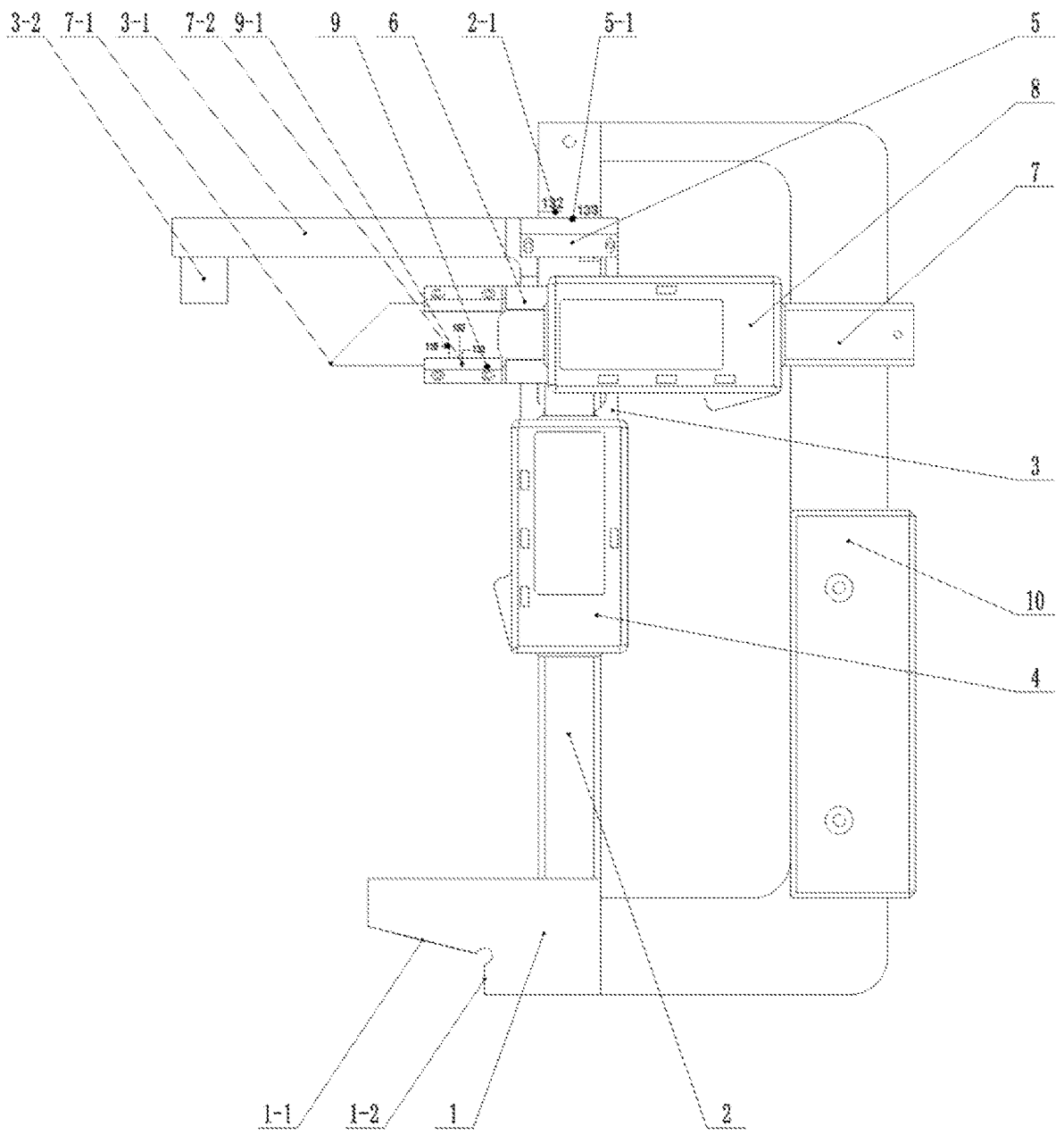
FIG. 1 is a schematic front view of the structure of a rail head abrader in accordance with an embodiment of the present invention.

Reference numerals in the drawings are: 1 base, 1-1 base bevel edge, 1-2 base vertical edge, 2 blade, 2-1 vertical wear rail type selection line, 3 vertical scale frame, 3-1 frame claw, 3-2 frame jaw probe, 4 vertical digital display device, 5 vertical scale frame cursor, 5-1 upper bevel edge of the vertical scale frame cursor, 6 horizontal scale frame, 7 horizontal measuring rod, 7-1 horizontal measuring rod probe, 7-2 side wear rail type selection line, 8 horizontal digital display device, 9 horizontal scale frame cursor, 9-1 horizontal scale frame cursor locating line, 10 handle, 11 rail under test, 12 rail.

A. intersection where the upper bevel edge of the rail base intersects the side vertical edge of the rail base, B. side wear measuring point of the rail head, C. vertical wear measuring point of the rail head, A1. intersection where the base bevel edge intersects the base vertical edge, B1. measuring face of the horizontal measuring rod, C1. measuring face of the frame jaw probe, D1. vertical distance of C1-A, D2. horizontal distance of B1-A1, ND1. nominal vertical distance of standard rail C-A, ND2. nominal horizontal distance of standard rail B-A.

DESCRIPTION OF EMBODIMENTS

Further elaboration of the present invention will now be made in conjunction with the embodiments and drawings, and it will be apparent that the described embodiments are only some, but not all, embodiments of the invention. Based on the embodiments in the present invention, all other embodiments obtained by a person of ordinary skill in the art without creative effort fall within the protection scope of the present invention.

Embodiment

As shown in FIG. 1, a rail head abrader includes a base 1, a blade 2, a vertical measurement section and a horizontal measurement section; wherein, an upper end surface of the base 1 is horizontally disposed, a base bevel edge 1-1 is provided on a lower left side of the base 1 and a base vertical edge 1-2 is provided in a middle of the base 1, the base bevel edge 1-1 intersects the base vertical edge 1-2; the blade is disposed on the base 1 and perpendicular to the upper end surface of the base 1, an upper portion of the blade 2 is engraved with vertical wear rail type selection lines 2-1;

the vertical measurement section includes:

a vertical scale frame 3 slidably mounted on the blade 2 and slidable up and down; wherein a top portion of the vertical scale frame 3 extends left to form a frame jaw 3-1, a front lower end of the frame jaw 3-1 is provided with a frame jaw probe 3-2;

a vertical digital display device 4 disposed at a lower portion of the vertical scale frame 3; and a vertical scale frame cursor 5 disposed at an upper portion of the vertical scale frame 3;

the horizontal measurement section includes:

a horizontal scale frame 6 disposed in an upper middle of the vertical scale frame 3;

a horizontal measuring rod 7, wherein a horizontal measuring rod probe 7-1 is provided on a left end of the horizontal measuring rod 7, a left portion of the horizontal measuring rod 7 is engraved with side wear rail type selection lines 7-2;

a horizontal digital display device 8 disposed on a right portion of the horizontal scale frame 6; and a horizontal scale frame cursor 9 engraved with a horizontal scale frame cursor locating line 9-1; wherein the horizontal scale frame cursor 9 is disposed at a left portion of the horizontal scale frame 6; the horizontal scale frame cursor locating line 9-1 corresponds with the side wear rail type selection lines 7-2;

wherein the horizontal measuring rod 7 is slidably mounted on the horizontal scale frame 6 and slidable left and right.

Further, a handle 10 is included, the handle 10 is a frame handle, an upper portion of the handle 10 is connected to the upper portion of the blade 2, and a lower portion of the handle 10 is connected to the base 1. The use of a frame handle allows the present abrader to be held conveniently by a user for measuring operations, and facilitates the overall structural stability of the abrader.

In particular, the blade 2 is riveted vertically above the base, a plurality of vertical wear rail type selection lines 2-1 are engraved on the upper portion of the blade 2, the vertical digital display device 4 is fastened to the lower portion of the vertical scale frame 3 with screw, the vertical scale frame cursor 5 is fastened on the upper portion of the vertical scale frame with screw, the horizontal scale frame 6 is fastened above the vertical scale frame 3 with screw, a horizontal measuring rod 7 is slidably mounted on the horizontal scale frame 6 and slidable back and forth, the horizontal measuring bar 7 is engraved with a plurality of side wear rail type selection lines 7-2, the horizontal digital display device 8 is fastened onto the horizontal scale frame 6 with screw, and the horizontal scale frame cursor 9 engraved with a horizontal scale frame cursor locating line 9-1 is fastened onto a left front portion of the horizontal scale frame 6.

Figure 2:
FIG. 2 is a schematic illustration of nominal dimension markings of ND1 and ND 2 of 133RE standard rail.
Figure 3:
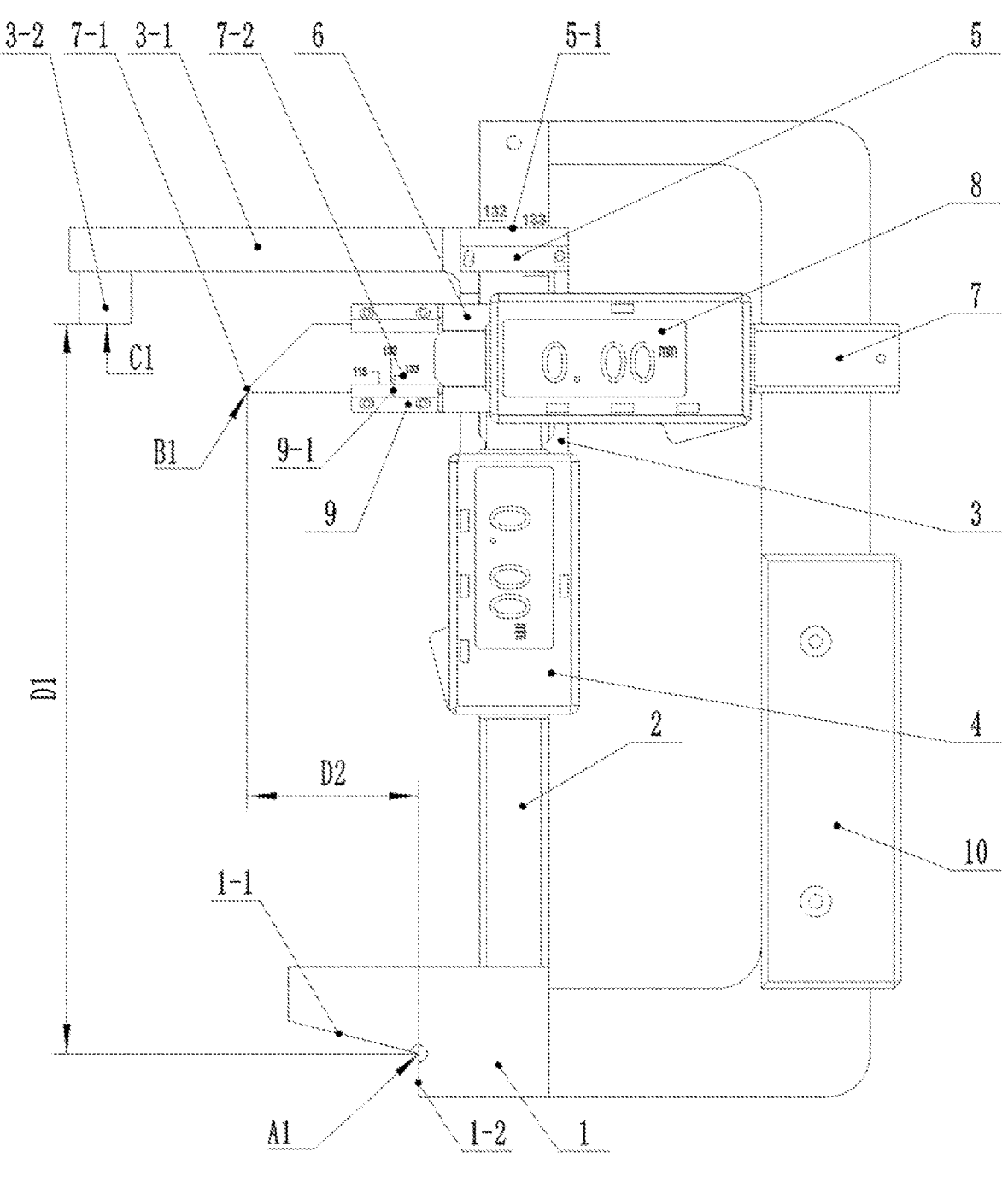
FIG. 3 is a schematic illustration of the D1 dimension marking when the upper bevel edge of the vertical scale frame cursor of the present invention is aligned with the 133RE rail type selection line; and a schematic illustration of the D2 dimension marking when the horizontal scale frame cursor locating line is aligned with the 133RE rail type selection line on the horizontal measuring rod.

As shown in FIG. 2 and FIG. 3, the marking rules for the vertical wear rail type selection lines 2-1 on the vertical blade 2 are that: the intersection A of the upper bevel edge of the rail base and the side vertical edge of the rail base is used as a positioning reference point, the vertical distance from the positioning reference point to the vertical wear testing point of the corresponding rail type is used to determine an extension length of the frame jaw 3-1, to ensure that the measuring face of the frame jaw probe 3-2 is always in contact with the vertical wear testing point of the selected rail 12; meanwhile, when the upper bevel edge 5-1 of the vertical scale frame cursor is aligned with one rail type select line, the vertical distance of the measuring face C1 of the jaw probe to the intersection A where the base bevel edge meets the base vertical edge A1, i.e. the vertical distance D1 of C1-A1, is equal to the nominal vertical distance of the vertical wear testing point C of the rail head of the standard rail of current type to the intersection A where the upper bevel edge meets the side vertical edge of the standard rail base of current type, i.e. the nominal vertical distance ND1 of the standard rail C-A;

As shown in FIG. 2 and FIG. 3, the marking rules for the side wear rail type selection lines 7-2 on the horizontal measuring rod 7 are that: the highest point of the top centerline of the rail head under test is used as a positioning reference, the location of the side wear testing point of the current rail is determined according to the requirement for the vertical distance from the highest point of the top centerline of the rail head to the side wear testing point of the rail head in the respective national standards (Note: The side wear testing point of the rail head in one national standard is the same location for all rails within that standard, for example, the Canadian rail standard specifies ⅝" down from the highest point of the top centerline of the rail head under test as the side wear testing point of all rails); meanwhile, when the horizontal scale frame cursor locating line 9-1 is aligned with one rail type selection line on the horizontal measuring rod 7, the horizontal distance of the measuring face B1 of the horizontal measuring rod to the intersection A1 where the base bevel edge intersects the base vertical edge, i.e. the horizontal distance of B1-A1, is equal to the nominal horizontal distance of the side wear testing point B of the rail head of the standard rail of current type to the intersection A where the upper bevel edge of the rail base intersects the side vertical edge of the standard rail base of current type, i.e. the nominal horizontal distance ND2 of the standard rail B-A.

Figure 4:
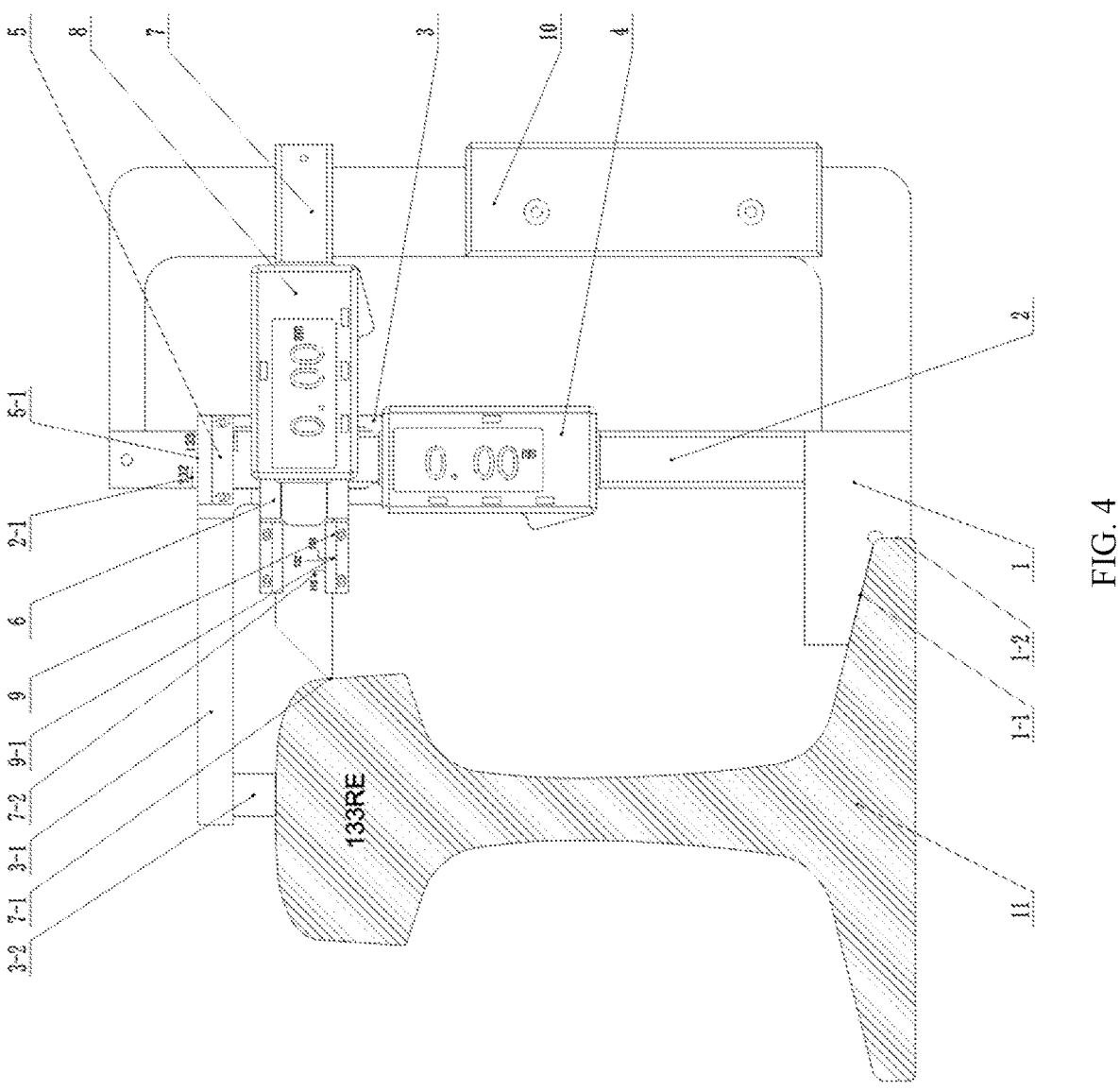
FIG. 4 is a schematic illustration of a rail head abrader measuring the vertical wear and side wear of the rail head of 133RE rail in accordance with an embodiment of the invention.

As shown in FIG. 4, a method of measuring vertical wear and side wear of the rail head of the 133RE rail by the rail head abrader as described above, includes the steps of:

1) adjusting a position of the vertical scale frame 3 according to a type of the rail 11 under test, aligning an upper edge of upper bevel edge 5-1 of the vertical scale frame cursor on the vertical scale frame 3 with the 133RE rail type line in the blade rail type select lines 2-1;

2) zeroing a display screen by pressing a clear switch on the vertical digital display device 4;

3) adjusting a position of the horizontal measuring rod 7 according to the type of the rail 11 under test to align the horizontal scale frame cursor locating line 9-1 with the 133RE rail type line in the side wear rail type selection lines 7-2;

4) zeroing a display screen by pressing a clear switch on the horizontal digital display device 8;

5) moving the vertical scale frame 3 upwards and horizontal measuring rod 7 backwards to make way for the rail head under test, and clamping the base 1 to the rail base below the working side of the rail 11 under test, so that the base bevel edge 1-1 and the base vertical edge 1-2 are in close fit with the rail base bevel edge and the rail base vertical edge of the rail under test;

6) moving the vertical scale frame 3 downwards so that the frame jaw probe 3-2 is kept in contact with a top of the rail 11 under test;

7) moving the horizontal measuring rod 7 forward so that the probe 7-1 of the horizontal measuring rod is kept in contact with a side of the rail 11 under test;

8) recording the number displayed on the display screen of the vertical digital device 4 at this time as the vertical wear of the rail head of the rail 11 under test, and the number displayed on the display screen of the horizontal digital device 8 at this time as the side wear of the rail head of the rail 11 under test.

While embodiments of the invention have been shown and described, it will be apparent to a person of ordinary skill in the art that numerous changes, modifications, substitutions and alterations can be made to these embodiments without departing from the principles and spirit of the invention, the protection scope of the present invention is defined by the appended claims and their equivalents.

The invention claimed is:

1. A rail head abrader characterized by comprising a base (1), a blade (2), a vertical measurement section and a horizontal measurement section; wherein, an upper end surface of the base (1) is horizontally disposed, a base bevel edge (1-1) is provided on a lower left side of the base (1) and a base vertical edge (1-2) is provided in a middle of the base (1), the base bevel edge (1-1) intersects the base vertical edge (1-2); the blade is disposed on the base (1) and perpendicular to the upper end surface of the base (1), an upper portion of the blade (2) is engraved with vertical wear rail type selection lines (2-1);

the vertical measurement section comprises:

a vertical scale frame (3) slidably mounted on the blade (2) and slidable up and down; wherein a top portion of the vertical scale frame (3) extends left to form a frame jaw (3-1), a front lower end of the frame jaw (3-1) is provided with a frame jaw probe (3-2);

a vertical digital display device (4) disposed at a lower portion of the vertical scale frame (3); and a vertical scale frame cursor (5) disposed at an upper portion of the vertical scale frame (3);

the horizontal measurement section comprises:

a horizontal scale frame (6) disposed in an upper middle of the vertical scale frame (3);

a horizontal measuring rod (7), wherein a horizontal measuring rod probe (7-1) is provided on a left end of the horizontal measuring rod (7), a left portion of the horizontal measuring rod (7) is engraved with side wear rail type selection lines (7-2);

a horizontal digital display device (8) disposed on a right portion of the horizontal scale frame (6); and a horizontal scale frame cursor (9) engraved with a horizontal scale frame cursor locating line (9-1); wherein the horizontal scale frame cursor (9) is disposed at a left portion of the horizontal scale frame (6); the horizontal scale frame cursor locating line (9-1) corresponds with the side wear rail type selection lines (7-2);

wherein the horizontal measuring rod (7) is slidably mounted on the horizontal scale frame (6) and slidable left and right.

2. A rail head abrader according to claim 1, comprising a handle (10) which is a frame handle, wherein an upper portion of the handle (10) is connected to the upper portion of the blade (2), and a lower portion of the handle (10) is connected to the base (1).

* * * * *